US012317018B2

(12) United States Patent
Yu et al.

(10) Patent No.: US 12,317,018 B2
(45) Date of Patent: May 27, 2025

(54) COVER PLATE AND SPEAKER MODULE

(71) Applicant: AAC Microtech (Changzhou) Co., Ltd., Jiangsu (CN)

(72) Inventors: Jingwei Yu, Changzhou (CN); Qibo Li, Changzhou (CN); Zhongfeng Gao, Changzhou (CN); Siyuan Ni, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 245 days.

(21) Appl. No.: 18/324,130

(22) Filed: May 25, 2023

(65) Prior Publication Data

US 2024/0292137 A1 Aug. 29, 2024

Related U.S. Application Data

(63) Continuation of application No. PCT/CN2023/090040, filed on Apr. 23, 2023.

(30) Foreign Application Priority Data

Feb. 23, 2023 (CN) ......................... 202320304563.4

(51) Int. Cl.
*H04R 1/02* (2006.01)

(52) U.S. Cl.
CPC .................................... *H04R 1/025* (2013.01)

(58) Field of Classification Search
CPC ...... H04R 1/025; H04R 1/026; H04R 1/1075; H04R 1/02; H04R 9/02; H04R 1/023; H04R 2201/02; H04R 2499/15; H04R 2400/11; H04R 2499/11
See application file for complete search history.

(56) References Cited

U.S. PATENT DOCUMENTS 8,967,322 B2 * 3/2015 Zhang .................... H04R 1/025 381/345
9,866,662 B2 * 1/2018 Lee ..................... H04M 1/0277
10,003,870 B2 * 6/2018 Miao ....................... H04R 1/323
10,462,559 B2 * 10/2019 Zhang .................. H04R 1/2888
10,764,689 B2 * 9/2020 Zhang ...................... H04R 9/06

FOREIGN PATENT DOCUMENTS

CN 107820171 A * 3/2018 .............. H04R 9/02
CN 114401477 A * 4/2022

* cited by examiner

*Primary Examiner* — Ryan Robinson
(74) *Attorney, Agent, or Firm* — Wiersch Law Group

(57) ABSTRACT

A cover plate includes a substrate provided and a bridge structure. The bridge structure includes first and second ribs, and a bridge body. The first rib has first forming fillet formed at junction between the first rib and the substrate, and second forming fillet formed at junction between the first rib and the bridge body. The first and second forming fillets each have a radius greater than 0.6 mm. An included angle formed between a length extending direction of first rib and a plane of bridge body is greater than 120°. The first rib has a width smaller than a width of the second rib. With comprehensive consideration of a bridge angle, a bridge forming angle and a bridge width in design of the bridge structure, the first rib and the second rib are force-balanced, reduces a fracture risk of the rib, and improves a yield of the cover plate.

16 Claims, 7 Drawing Sheets

COVER PLATE AND SPEAKER MODULE

TECHNICAL FIELD

The disclosure belongs to the technical field of speaker modules, and particularly relates to a cover plate and a speaker module.

BACKGROUND

As a common electronic component in an audio device, a speaker is mainly used to play an audio signal. The structural design of the speaker has a direct impact on audio playback quality. A sounder of the speaker is directly fixed on a cover plate. The cover plate is press-formed by a steel sheet.

In a related art, a junction of a bridge structure in the cover plate is a fillet. When the steel sheet is press-formed, the junction of the bridge structure is prone to tension fracture to affect a yield of the cover plate.

Therefore, it is necessary to provide a novel cover plate.

SUMMARY

An objective of the disclosure is to provide a cover plate and a speaker module, to solve the problem that a bridge structure of a steel sheet is prone to fracture when stretch-formed in the related art.

The disclosure provides a cover plate. The cover plate includes a substrate provided with a notch at a side edge, and a bridge structure with two ends respectively fixed to sidewalls of the notch and a middle recessed toward a side. The bridge structure includes a first rib and a second rib respectively fixed to two opposite sidewalls of the notch, and a bridge body fixed to the first rib and the second rib. The first rib has a first forming fillet formed at a junction between the first rib and the substrate, and a second forming fillet formed at a junction between the first rib and the bridge body. The first forming fillet has a radius greater than 0.6 mm, and the second forming fillet has a radius greater than 0.6 mm. An included angle formed between a length extending direction of the first rib and a plane of the bridge body is greater than 120°. The first rib has a width smaller than a width of the second rib.

As an improvement, the radius of the first forming fillet and the radius of the second forming fillet each fall into a range of 0.7 mm to 0.9 mm.

As an improvement, the included angle formed between the length extending direction of the first rib and the plane of the bridge body falls into a range of 130° to 140°.

As an improvement, a ratio of the width of the first rib to the width of the second rib falls into a range of 0.55 to 0.75.

As an improvement, the width of the first rib is smaller than 1.9 mm.

As an improvement, the bridge body is spaced apart from the sidewalls of the notch. Along a direction from the second rib to the first rib, a distance between the bridge body and a sidewall opposite to an opening of the notch decreases gradually.

As an improvement, a distance between a plate surface of the bridge body and the first rib, and a distance between the plate surface of the bridge body and the second rib each fall into a range of 0.8 mm to 1.2 mm.

As an improvement, the bridge body has a third forming fillet formed at a junction between the bridge body and the second rib, and the second rib has a fourth forming fillet formed at a junction between the second rib and an inner wall of the notch, wherein a radius of the third forming fillet and a radius of the fourth forming fillet each fall into a range of 0.3 mm to 0.5 mm.

The disclosure provides a speaker module, including a cover plate and a speaker unit fixed to the cover plate. The cover plate includes a substrate provided with a notch at a side edge, and a bridge structure with two ends respectively fixed to sidewalls of the notch and a middle recessed toward a side. The bridge structure includes a first rib and a second rib respectively fixed to two opposite sidewalls of the notch, and a bridge body fixed to the first rib and the second rib. The first rib has a first forming fillet formed at a junction between the first rib and the substrate, and a second forming fillet formed at a junction between the first rib and the bridge body. The first forming fillet has a radius greater than 0.6 mm, and the second forming fillet has a radius greater than 0.6 mm. An included angle formed between a length extending direction of the first rib and a plane of the bridge body is greater than 120°. The first rib has a width smaller than a width of the second rib.

As an improvement, the radius of the first forming fillet and the radius of the second forming fillet each fall into a range of 0.7 mm to 0.9 mm.

As an improvement, the included angle formed between the length extending direction of the first rib and the plane of the bridge body falls into a range of 130° to 140°.

As an improvement, a ratio of the width of the first rib to the width of the second rib falls into a range of 0.55 to 0.75.

As an improvement, the width of the first rib is smaller than 1.9 mm.

As an improvement, the bridge body is spaced apart from the sidewalls of the notch. Along a direction from the second rib to the first rib, a distance between the bridge body and a sidewall opposite to an opening of the notch decreases gradually.

As an improvement, a distance between a plate surface of the bridge body and the first rib, and a distance between the plate surface of the bridge body and the second rib each fall into a range of 0.8 mm to 1.2 mm.

As an improvement, the bridge body has a third forming fillet formed at a junction between the bridge body and the second rib, and the second rib has a fourth forming fillet formed at a junction between the second rib and an inner wall of the notch, wherein a radius of the third forming fillet and a radius of the fourth forming fillet each fall into a range of 0.3 mm to 0.5 mm.

The disclosure has the following beneficial effects. The radius of the first forming fillet R1 (bridge forming fillet) and the radius of the second forming fillet R2 (bridge forming fillet) each are greater than 0.6 mm. The included angle θ (bridge angle) between the length extending direction of the first rib and the plane of the bridge body is greater than 120°. The width a (bridge width) of the first rib is smaller than the width b (bridge width) of the second rib. Compared with a bridge structure in the related art, the disclosure comprehensively considers the bridge angle, bridge forming fillet and bridge width in design of the bridge structure. The bridge angle is gentler, the bridge forming fillet is larger, and the bridge width of the first rib and the bridge width of the second rib are provided respectively. This makes the first rib and the second rib force-balanced, reduces a fracture risk of the rib, and improves a yield of the cover plate.

DETAILED DESCRIPTION OF EMBODIMENTS

Figure 1:
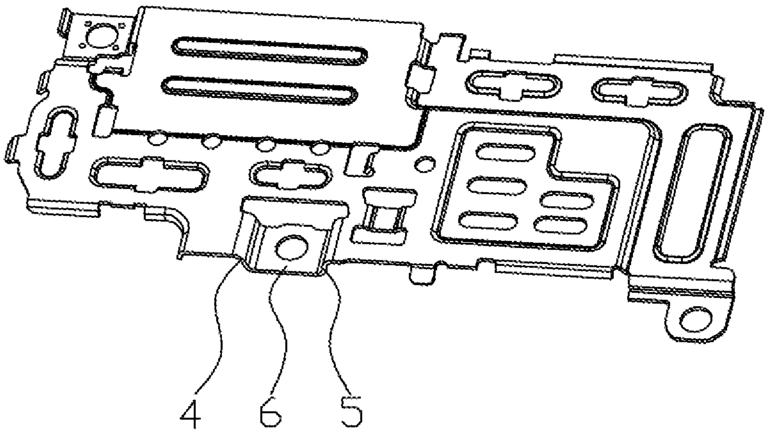
FIG. 1 is an overall structural view of a cover plate according to a related art.

The disclosure is further described below with reference to the drawings and implementations.

A speaker module includes a cover plate and a speaker unit fixed to the cover plate. The speaker module includes a front shell fixed to the cover plate and a rear shell covering a side of the front shell away from the cover plate. The front shell and the rear shell define an accommodating cavity. The speaker unit is accommodated in the accommodating cavity.

Referring to FIG. 2 to FIG. 7, the cover plate includes a substrate 1 provided with a notch 11 at a side edge, and a bridge structure 2 with two ends respectively fixed to sidewalls of the notch 11 and a middle recessed toward one side. The bridge structure 2 includes a first rib 21 and a second rib 22 respectively fixed to two opposite sidewalls of the notch 11, and a bridge body 23 fixed to the first rib 21 and the second rib 22. The first rib 21 has a first forming fillet R1 formed at junction between the first rib 21 and the substrate 1 forms, and a second forming fillet R2 formed at a junction between the first rib 21 and the bridge body 23 forms. A radius of the first forming fillet R1 and a radius of the second forming fillet R2 each are greater than 0.6 mm. An included angle between a length extending direction of the first rib 21 and a plane of the bridge body 23 is greater than 120°. A width of the first rib 21 is smaller than a width of the second rib 22.

The radius of the first forming fillet R1 (bridge forming fillet) and the radius of the second forming fillet R2 (bridge forming fillet) each are greater than 0.6 mm. The included angle θ (bridge angle) formed between the length extending direction of the first rib 21 and the plane of the bridge body 23 is greater than 120°. The width a (bridge width) of the first rib 21 is smaller than the width b (bridge width) of the second rib 22. Compared with a bridge structure 2 in the related art, the disclosure comprehensively considers the bridge angle, bridge forming fillet and bridge width in design of the bridge structure 2. The bridge angle is gentler, the bridge forming fillet is larger, and the bridge width of the first rib 21 and the bridge width of the second rib 22 are provided respectively. This makes the first rib 21 and the second rib 22 force-balanced, reduces a fracture risk of the rib, and improves a yield of the cover plate.

Referring to FIG. 1, a first rib 3 and a second rib 4 of the bridge structure in the related art are symmetric with respect to a central axis of a bridge body 5. The bridge structure has a first forming fillet of 0.4 mm, a second forming fillet of 0.3 mm, and a bridge angle of 105°. A bridge width of the first rib 3 and a bridge width of the second rib 4 are the same and are respectively 2.8 mm.

Figure 2:
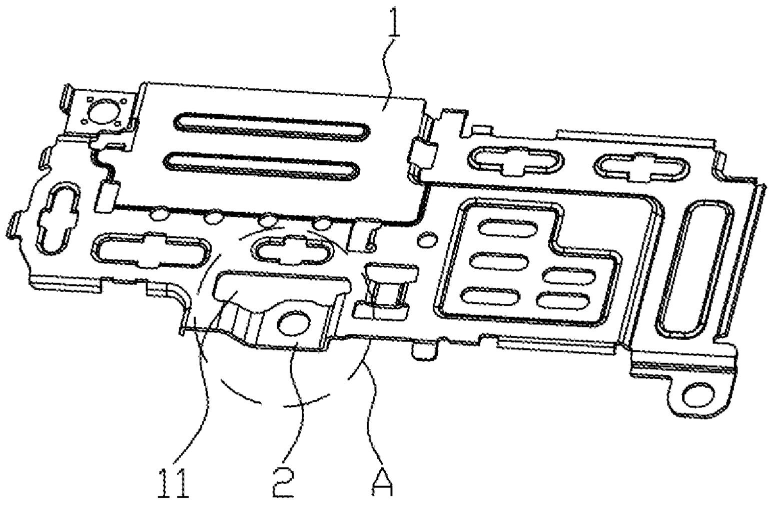
FIG. 2 is an overall structural view of a cover plate according to an embodiment of the disclosure.
Figure 3:
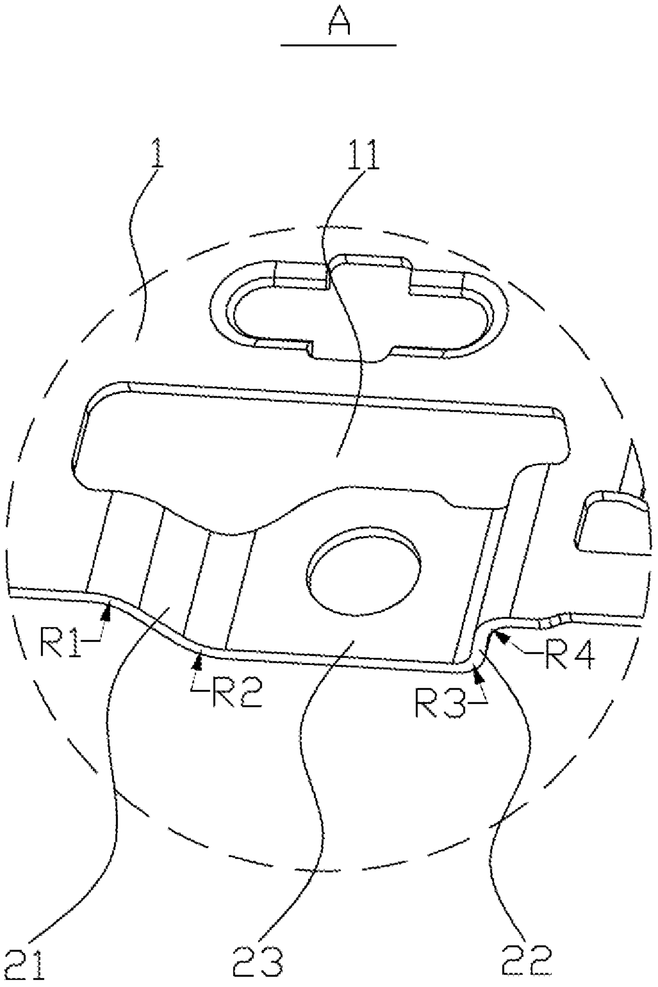
FIG. 3 is an enlarged view of A shown in FIG. 2.

Referring to FIG. 2 and FIG. 3, in some embodiments, the radius of the first forming fillet R1 and the radius of the second forming fillet R2 each fall into a range of 0.7 mm to 0.9 mm. For example, the radius of the first forming fillet R1 is 0.7 mm, 0.8 mm, and 0.9 mm. The radius of the second forming fillet R2 is 0.7 mm, 0.8 mm, and 0.9 mm. Thus, the first rib 21 has a simpler shape, for ease of formation of the first rib 21. In some embodiments, the radius of the first forming fillet R1 and the radius of the second forming fillet R2 are the same. For example, the radius of the first forming fillet R1 and the radius of the second forming fillet R2 each are 0.8 mm.

Figure 4:
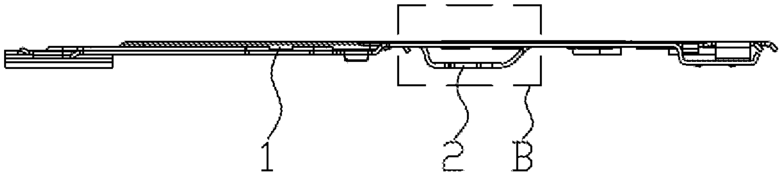
FIG. 4 is a front view of a cover plate according to an embodiment of the disclosure.
Figure 5:
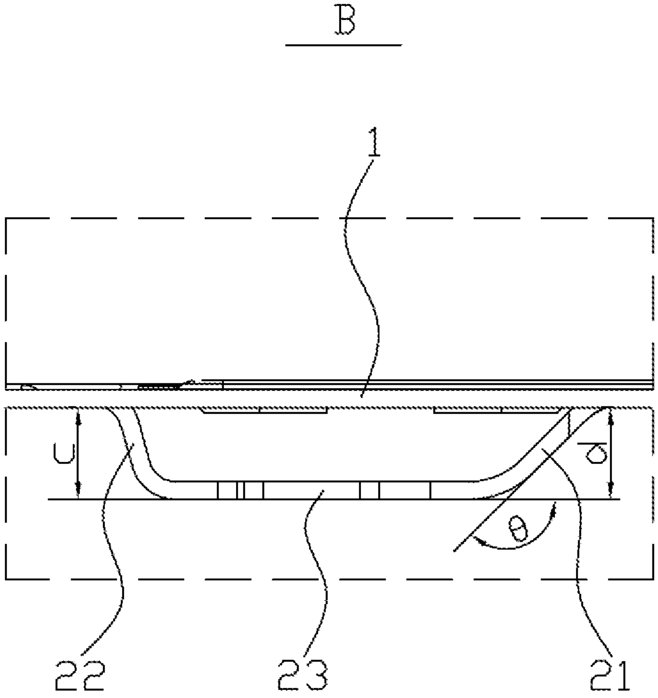
FIG. 5 is an enlarged view of B shown in FIG. 4.

Referring to FIG. 4 and FIG. 5, in some embodiments, the included angle formed between the length extending direction of the first rib 21 and the plane of the bridge body 23 falls into a range of 130° to 140°. Within this range, an appropriate bridge angle is achieved to make the first rib 21 and the second rib 22 force-balanced. For example, the included angle is 130°, 132°, 135°, 138° and 140°.

Figure 6:
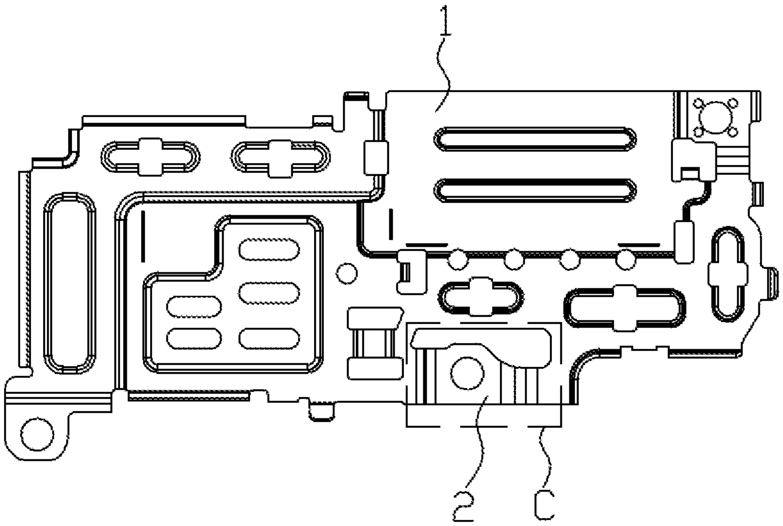
FIG. 6 is a top view of a cover plate according to an embodiment of the disclosure.
Figure 7:
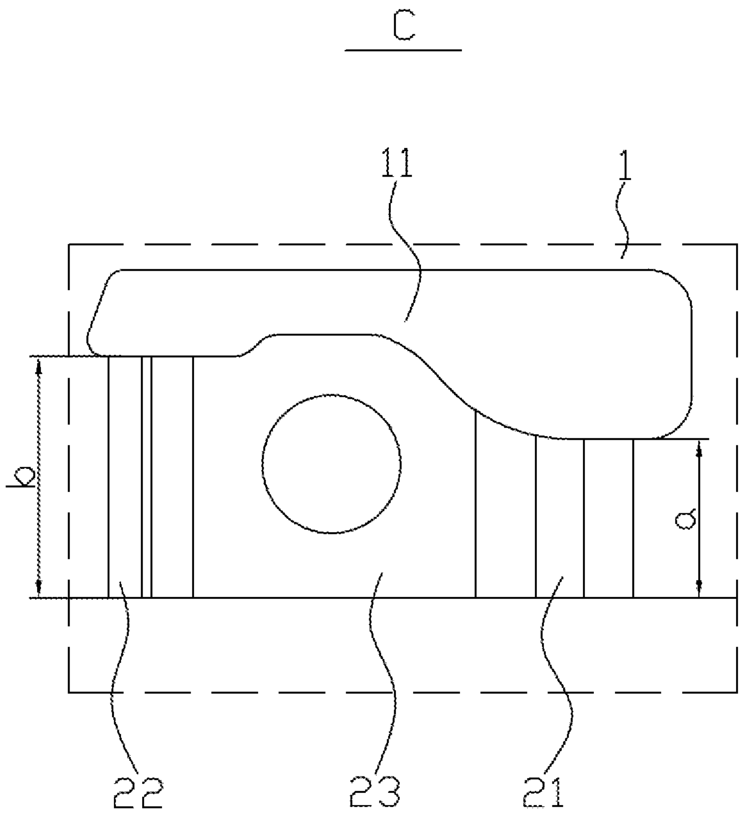
FIG. 7 is an enlarged view of C shown in FIG. 6.

Referring to FIG. 6 and FIG. 7, in some embodiments, a ratio of the width a of the first rib 21 to the width b of the second rib 22 falls into a range of 0.55 to 0.75, such that the first rib 21 and the second rib 22 are force-balanced. In some embodiments, the width a of the first rib 21 is smaller than 1.9 mm, and is 1.9 mm, 1.85 mm, 1.8 mm and 1.7 mm for example. In some embodiments, the width a of the first rib 21 is 1.85 mm, and the width b of the second rib 22 is 2.8 mm.

Referring to FIG. 2, FIG. 3 and FIG. 6, in an embodiment, the bridge body 23 is spaced apart from the sidewalls of the notch 11. Along a direction from the second rib 22 to the first rib 21, a distance between the bridge body 23 and a sidewall opposite to an opening of the notch 11 decreases gradually. In some embodiments, the notch 11 has a first sidewall, a second sidewall connected to the first sidewall, and a third sidewall connected to the second sidewall and opposite to the first sidewall. A junction between a side of the bridge body 23 close to the second sidewall and a side of the first rib 21 close to the second sidewall is an arc. This prevents a sharp decrease of a width at the junction between the bridge body 23 and the first rib 21, and further prevents the fracture risk of the first rib 21.

Referring to FIG. 4 and FIG. 5, in an embodiment, a distance c between a plate surface of the bridge body 23 and the first rib 21, and a distance d between the plate surface of the bridge body 23 and the second rib 22 each fall into a range of 0.8 mm to 1.2 mm, and are 0.8 mm, 0.9 mm, 1 mm and 1.2 mm for example. In some embodiments, the distance c between the plate surface of the bridge body 23 and the first rib 21, and the distance d between the plate surface of the bridge body 23 and the second rib 22 are the same and are respectively 1 mm. This makes the first rib 21 and the second rib 22 force-balanced.

Referring to FIG. 2 and FIG. 3, in some embodiments, the bridge body 23 has a third forming fillet R3 formed at a junction between the bridge body 23 and the second rib 22, and the second rib 22 has a fourth forming fillet R4 formed at a junction between the second rib 22 and the third sidewall. A radius of the third forming fillet R3 and a radius of the fourth forming fillet R4 each fall into a range of 0.3 mm to 0.5 mm, and are 0.3 mm, 0.35 mm, 0.4 mm and 0.5 mm for example. In some embodiments, the radius of the third forming fillet R3 is 0.3 mm, and the radius of the fourth forming fillet R4 is 0.4 mm. This further makes the first rib 21 and the second rib 22 force-balanced.

The above described are merely implementations of the disclosure. It should be noted here that those of ordinary skill in the art may make improvements without departing from the concept of the disclosure, but these improvements should fall within the protection scope of the disclosure.

What is claimed is:

1. A cover plate, comprising:

a substrate provided with a notch at a side edge; and a bridge structure with two ends respectively fixed to sidewalls of the notch and a middle recessed toward a side, wherein the bridge structure comprises a first rib and a second rib respectively fixed to two opposite sidewalls of the notch, and a bridge body fixed to the first rib and the second rib, wherein the first rib has a first forming fillet formed at a junction between the first rib and the substrate, and a second forming fillet formed at a junction between the first rib and the bridge body, wherein the first forming fillet has a radius greater than 0.6 mm, the second forming fillet has a radius greater than 0.6 mm; an included angle formed between a length extending direction of the first rib and a plane of the bridge body is greater than 120°; and the first rib has a width smaller than a width of the second rib.

2. The cover plate as described in claim 1, wherein the radius of the first forming fillet and the radius of the second forming fillet each fall into a range of 0.7 mm to 0.9 mm.

3. The cover plate as described in claim 1, wherein the included angle formed between the length extending direction of the first rib and the plane of the bridge body falls into a range of 130° to 140°.

4. The cover plate as described in claim 1, wherein a ratio of the width of the first rib to the width of the second rib falls into a range of 0.55 to 0.75.

5. The cover plate as described in claim 4, wherein the width of the first rib is smaller than 1.9 mm.

6. The cover plate as described in claim 4, wherein the bridge body is spaced apart from the sidewalls of the notch; and along a direction from the second rib to the first rib, a distance between the bridge body and a sidewall opposite to an opening of the notch decreases gradually.

7. The cover plate as described in claim 1, wherein a distance between the first rib and a plate surface of the bridge body, and a distance between the second rib and the plate surface of the bridge body each fall into a range of 0.8 mm to 1.2 mm.

8. The cover plate as described in claim 1, wherein the bridge body has a third forming fillet formed at a junction between the bridge body and the second rib, and the second rib has a fourth forming fillet formed at a junction between the second rib and an inner wall of the notch, wherein a radius of the third forming fillet and a radius of the fourth forming fillet each fall into a range of 0.3 mm to 0.5 mm.

9. A speaker module, comprising a cover plate and a speaker unit fixed to the cover plate, wherein the cover plate comprises a substrate provided with a notch at a side edge, and a bridge structure with two ends respectively fixed to sidewalls of the notch and a middle recessed toward a side; and wherein the bridge structure comprises a first rib and a second rib respectively fixed to two opposite sidewalls of the notch, and a bridge body fixed to the first rib and the second rib, wherein the first rib has a first forming fillet formed at a junction between the first rib and the substrate, and a second forming fillet formed at a junction between the first rib and the bridge body, wherein the first forming fillet has a radius greater than 0.6 mm, the second forming fillet has a radius greater than 0.6 mm; an included angle formed between a length extending direction of the first rib and a plane of the bridge body is greater than 120°; and the first rib has a width smaller than a width of the second rib.

10. The speaker module as described in claim 9, wherein the radius of the first forming fillet and the radius of the second forming fillet each fall into a range of 0.7 mm to 0.9 mm.

11. The speaker module as described in claim 9, wherein the included angle formed between the length extending direction of the first rib and the plane of the bridge body falls into a range of 130° to 140°.

12. The speaker module as described in claim 9, wherein a ratio of the width of the first rib to the width of the second rib falls into a range of 0.55 to 0.75.

13. The speaker module as described in claim 12, wherein the width of the first rib is smaller than 1.9 mm.

14. The speaker module as described in claim 12, wherein the bridge body is spaced apart from the sidewalls of the notch; and along a direction from the second rib to the first rib, a distance between the bridge body and a sidewall opposite to an opening of the notch decreases gradually.

15. The speaker module as described in claim 9, wherein a distance between the first rib and a plate surface of the bridge body, and a distance between the second rib and the plate surface of the bridge body each fall into a range of 0.8 mm to 1.2 mm.

16. The speaker module as described in claim 9, wherein the bridge body has a third forming fillet formed at a junction between the bridge body and the second rib, and the second rib has a fourth forming fillet formed at a junction between the second rib and an inner wall of the notch, wherein a radius of the third forming fillet and a radius of the fourth forming fillet each fall into a range of 0.3 mm to 0.5 mm.

* * * * *